United States Patent
Bansemir et al.

(10) Patent No.: US 10,245,948 B2
(45) Date of Patent: Apr. 2, 2019

(54) ECO 4×4 FRONT-AXLE TRANSMISSION HAVING AN INTEGRATED SHUT-OFF UNIT FOR ALL WHEEL DRIVES

(71) Applicant: Bayerische Motoren Werke Aktiengesellschaft, Munich (DE)

(72) Inventors: Gero Bansemir, Munich (DE); Hans Rastel, Windach (DE); Dirk Stammann, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/431,912

(22) Filed: Feb. 14, 2017

(65) Prior Publication Data

US 2017/0151873 A1    Jun. 1, 2017

Related U.S. Application Data

(63) Continuation of application No. PCT/EP2015/068016, filed on Aug. 5, 2015.

(30) Foreign Application Priority Data

Sep. 3, 2014    (DE) .................. 10 2014 217 553

(51) Int. Cl.
  *B60K 23/08*    (2006.01)
  *F16H 48/08*    (2006.01)
  (Continued)

(52) U.S. Cl.
  CPC .............. *B60K 23/08* (2013.01); *B60K 17/16* (2013.01); *B60K 17/165* (2013.01);
  (Continued)

(58) Field of Classification Search
  None
  See application file for complete search history.

(56) References Cited

U.S. PATENT DOCUMENTS 3,908,775 A * 9/1975 Van Fossen ....... B60K 17/3467
                                                            180/250
4,271,722 A    6/1981 Campbell
(Continued)

FOREIGN PATENT DOCUMENTS

CN    2050107 U    12/1989
CN    1771405 A    5/2006
(Continued)

OTHER PUBLICATIONS

Chinese-language Office Action issued in counterpart Chinese Application No. 201580032052.X dated Apr. 3, 2018 with English translation (fifteen (15) pages).
(Continued)

*Primary Examiner* — Timothy Hannon
(74) *Attorney, Agent, or Firm* — Crowell & Moring LLP

(57) ABSTRACT

An axle drive mechanism includes a driving toothed wheel, a drive mechanism housing, a differential cage, a differential gear, a first and a second output shaft, and at least one shiftable torque transmission device. The at least one shiftable torque transmission is disposed between the driving toothed wheel and the first output shaft and includes a torque transmission region. The torque transmission region is at least partially disposed between said differential cage bearings in the axial direction.

10 Claims, 3 Drawing Sheets

(51) Int. Cl.
*B60K 17/16* (2006.01)
*B60K 17/35* (2006.01)

(52) U.S. Cl.
CPC ......... *B60K 17/3515* (2013.01); *F16H 48/08* (2013.01); *B60Y 2300/73* (2013.01)

(56) References Cited

U.S. PATENT DOCUMENTS

| | | | |
|---|---|---|---|
| 4,625,584 A | 12/1986 | Onodera | |
| 4,650,202 A | 3/1987 | Tsuzuki | |
| 4,915,190 A | 4/1990 | Iwata | |
| 5,908,080 A * | 6/1999 | Bigley | B60K 17/3515 |
| | | | 180/247 |
| 5,996,720 A | 12/1999 | Hunt | |
| 7,096,990 B2 | 8/2006 | Borgen et al. | |
| 2002/0169049 A1 | 11/2002 | Borgan et al. | |
| 2002/0187874 A1 * | 12/2002 | Kazaoka | B60K 17/35 |
| | | | 475/231 |
| 2005/0241422 A1 | 11/2005 | Fuhrer | |
| 2006/0135308 A1 | 6/2006 | Abraham | |
| 2010/0089685 A1 | 4/2010 | Quehenberger et al. | |
| 2010/0262347 A1 * | 10/2010 | Murota | B60K 23/04 |
| | | | 701/69 |
| 2012/0202636 A1 * | 8/2012 | Perakes | B60K 17/02 |
| | | | 475/220 |
| 2014/0274542 A1 * | 9/2014 | Schroeder | F16H 48/24 |
| | | | 475/231 |

FOREIGN PATENT DOCUMENTS

| | | |
|---|---|---|
| DE | 197 21 091 A1 | 11/1997 |
| DE | 102 30 184 A1 | 1/2004 |
| DE | 10 2009 049 013 A1 | 4/2010 |
| JP | 2-262429 A | 10/1990 |

OTHER PUBLICATIONS

Chinese-language Office Action issued in counterpart Chinese Application No. 201580032052.X dated Nov. 2, 2018 with English translation (10 pages).

German-language Search Report issued in counterpart German Application No. 10 2014 217 553.4 dated Apr. 24, 2015 with partial English translation (13 pages).

International Search Report (PCT/ISA/210) issued in PCT Application No. PCT/EP2015/068016 dated Jan. 19, 2016 with English translation (9 pages).

German-language Written Opinion (PCT/ISA/237) issued in PCT Application No. PCT/EP2015/068016 dated Jan. 19, 2016 (11 pages).

* cited by examiner

ECO 4×4 FRONT-AXLE TRANSMISSION HAVING AN INTEGRATED SHUT-OFF UNIT FOR ALL WHEEL DRIVES

CROSS REFERENCE TO RELATED APPLICATIONS

This application is a continuation of PCT International Application No. PCT/EP2015/068016, filed Aug. 5, 2015, which claims priority under 35 U.S.C. § 119 from German Patent Application No. 10 2014 217 553.4, filed Sep. 3, 2014, the entire disclosures of which are herein expressly incorporated by reference.

BACKGROUND AND SUMMARY OF THE INVENTION

The embodiments of the present invention relate to an axle transmission and to a method for operating such an axle transmission.

A conventional axle transmission is disclosed in U.S. Pat. No. 4,625,584.

The disclosure made herein will be described in connection with a drive train for a passenger car driven by an all-wheel drive; this does not represent a limitation of the embodiments of the invention to such an application.

All-wheel vehicles can be distinguished between those with permanent drive of all wheels and non-permanent drive of all wheels. With non-permanent all-wheel drive, there is a switching actuation and sensor that temporarily switches the non-driven wheels on or off, as needed. This selective drive of the wheels results in the advantage that in the axle transmissions of said wheels in the case that they are not driven, no load-dependent losses are incurred; load-independent losses are reduced, and therefore efficiency can be increased and $CO_2$ emissions can be reduced.

An example of a drive train for four-wheel drive vehicles in which certain wheels are only driven selectively is disclosed in U.S. Pat. No. 4,625,584, which relates to an axle drive mechanism device for intermittently disconnecting and connecting a drive axle of a four-wheel drive vehicle. The torque flow in at least one output shaft, which is disposed between the differential gear and a wheel of the vehicle, can be interrupted by way of a sleeve.

An object of the embodiments of the invention is to provide an axle drive mechanism having improved efficiency of the drive train. This and other objects are achieved by the inventive axle drive mechanism, and by a method for operating such an axle drive mechanism, as disclosed here.

As disclosed herein, an axle drive mechanism shall be understood to mean a drive device for distributing a driving power between a first wheel of a motor vehicle and a second wheel, in particular a left wheel and a right wheel. A wheel within this meaning shall be understood to mean a wheel/tire combination of a motor vehicle, in particular of a passenger car. An axle drive mechanism shall in particular be understood to mean an axle differential gear device, which is configured to enable speed differences between at least two wheels. Preferably, an axle drive mechanism is disposed between these first and second wheels of the vehicle, preferably between the right and left wheels. The driving power can be fed to the axle drive mechanism via the driving toothed wheel, in particular by means of a drive shaft, and the axle drive mechanism can distribute said power to the wheels.

As disclosed herein, a driving toothed wheel shall be understood to mean a gear wheel for receiving a driving power, in particular inside the axle drive mechanism. A driving toothed wheel in particular comprises outer teeth. A driving toothed wheel is preferably designed as a spur gear, preferably a bevel gear, and particularly preferably as a crown gear. The driving toothed wheel meshes with a drive pinion, in particular for receiving the driving power. The driving toothed wheel is preferably mounted on a differential cage and preferably can be non-rotatably connected thereto, in particular preferably the driving toothed wheel is non-rotatably connected to the differential cage.

As disclosed herein, a differential cage shall be understood to mean a device that is configured not only to accommodate the driving toothed wheel on an outer side, but also to accommodate a differential gear on an inner side or in a recess. The differential cage is preferably configured to accommodate a spur gear differential, and preferably to accommodate a bevel gear differential. The differential cage furthermore comprises at least one first and one second differential cage bearing and is rotatably mounted with the same with respect to a drive housing, in particular about a rotational axis.

The differential cage bearings are preferably designed as sliding bearings, preferably as rolling bearings. The first and second differential cage bearings are disposed spaced apart from one another in the axial direction. Said axial direction extends along the rotational axis about which the differential cage is rotatably mounted in the drive housing. The driving toothed wheel is preferably disposed between said differential cage bearings on the differential cage. It is also furthermore preferred if the differential gear is disposed between said differential cage bearings. The driving power can be transmitted from the driving toothed wheel to the differential cage, which can preferably deliver the driving power via the differential gear to the output shafts.

Within the meaning of the invention, such an output shaft shall be understood to mean an at least substantially rotation-symmetrical component, which is configured to transmit power (torque, speed). The output shafts are preferably rotatably mounted, more preferably at least two output shafts are disposed coaxially to one another, and the rotational axis of the output shafts preferably coincides with the rotational axis of the differential cage. More preferably, an output shaft shall be understood to mean a device by way of which the driving power can be at least partially transmitted from the differential gear in the direction of drivable wheels of the motor vehicle. The transmission of power to one of the wheels can be interrupted in particular by a shiftable torque transmission device.

As disclosed herein, a shiftable torque transmission device shall be understood to mean a device for selectively transmitting power (torque, speed) from an input side to an output side. A shiftable torque transmission device can preferably interrupt the torque flow based on a control command. The power is preferably transmitted by a form-locked or frictionally engaged connection. Furthermore preferably, a torque transmission device comprises at least one sliding coupling or sliding sleeve, preferably comprising form-locking elements. The shiftable torque transmission device can be used to interrupt in particular the torque flow between the driving toothed wheel and the first output shaft. For this purpose, the torque transmission device in particular has a torque transmission region.

A torque transmission region as used herein shall be understood to mean the region of the torque transmission device that can be influenced by a control command in such a way that a driving power can be transmitted, or cannot be transmitted, from the input side of the torque transmission device to the output side of the torque transmission device. To explain in image terms, in the case of a multi-disk clutch comprising a plurality of disks that can be frictionally connected to one another, said disks, and in particular the friction surfaces thereof, represent the torque transmission region, or in the case of a dog clutch, it is the dogs of said clutch engaging in one another during torque transmission.

As disclosed herein, the region between the differential cage bearings shall be understood to mean a certain region in the axial direction, which is to say along the rotational axis. This region preferably extends from the outermost point of the first differential cage bearing in the axial direction to the point located the furthest away therefrom, which is to say the outermost point, in the axial direction, of the second differential cage bearing. More preferably, this region extends from a geometric center, or a center of gravity, of a rolling element of the first differential cage bearing to a center, or a center of gravity, of a rolling element of the second differential cage bearing. Furthermore preferably, said region extends from the innermost point of the first differential cage bearing in the axial direction to the point of the second differential cage bearing located closest thereto, which is to say the innermost point of the second differential cage bearing.

Alternatively, the torque transmission region is at least partially disposed between said differential cage bearings in the axial direction. As disclosed herein, this shall be understood in such a way that at least a portion of the power transmittable from the input side to the output side of the torque transmission device can be transmitted between the differential cage bearings in the axial direction. To explain in image terms, this means, with respect to a multi-disk clutch, that at least one friction surface between a disk and a mating disk is disposed between the differential cage bearings in the axial direction, wherein further disks and mating disks may also be disposed outside the differential cage bearings. It is preferred if at least 1% of the torque transmission region is disposed between the differential cage bearings, especially at least 20%, preferably at least 50%, and particularly preferably at least 75% or especially particularly preferably 100%. In particular such an arrangement of the torque transmission region achieves the separation of the torque flow on the one hand, and makes a particularly compact design of the axle drive mechanism possible, and thus, on the other hand, allows an improved axle drive mechanism to be achieved.

Preferably, the torque transmission region is disposed inside at least one of the differential cage bearings in the radial direction. The torque transmission region is preferably disposed radially inside the differential cage bearing adjoining the torque transmission region. Within this meaning, 'radially inside' shall be understood to mean that the torque transmission region is disposed at least inside a bearing race or preferably inside a bearing inner ring. In particular this embodiment of the torque transmission region allows further compacting of the axle drive mechanism, thus making it possible to implement an improved axle drive mechanism.

Preferably, the torque transmission device comprises a radially inner output part and a radially outer driving part. The driving part makes contact with the output part in the torque transmission region, and preferably a form-locked connection can be formed between the output part and the driving part. In particular form-locked connections are suitable for transmitting particularly high torques while requiring little installation space, thus allowing an improved axle drive mechanism to be implemented. The driving part is preferably designed as a sliding sleeve, and the output part is designed as a counter-piece to said sliding sleeve and to accommodate the same. More preferably, a dog clutch connection can be formed by the driving part and the output part.

Preferably, the driving part and the output part each comprise one first form-locking element and at least one further form-locking element, in particular several further rows of form-locking elements, so as to form the form-locked connection. Form-locking elements shall in particular be understood to mean teeth or dogs that are configured to transmit power. More preferably, at least two consecutive rows of such form-locking elements are spaced apart from one another in the axial direction by a gap. More preferably, this gap is larger than the axial extension of at least one of the rows of form-locking elements.

In a first operating mode of the torque transmission device, the driving part and the output part are positioned in such a way with respect to one another that at least one row of form-locking elements is positioned in one of the gaps between these, on the respective other component (driving part, output part). In particular said positioning of the form-locking elements, or of the driving and output parts, with respect to one another prevents torque from being transmitted from the driving part to the output part in this operating mode. The torque can in particular not be transmitted because the form-locking elements of the one component (driving part, driven part) are positioned in the gaps of the respective other component (output part, driving part).

Preferably in a second operating mode, the output part and the driving part are positioned in such a way that the form-locking elements of the output part can be contacted by the form-locking elements of the driving part, whereby in this operating mode torque can be transmitted, preferably transmitted in a form-locked manner, from the driving part to the output part of the torque transmission device.

Preferably, the driving part is displaceably mounted in the axial direction. The driving part is preferably mounted movably between a first axial end position and a second axial end position. The driving part is preferably displaceably mounted along the extension of the rotational axis. In particular said displaceability allows the torque transmission device to be switched in a particularly easy manner between said first operating mode and said second operating mode, and thus allows an improved axle drive mechanism to be achieved.

Preferably, the torque transmission device can be transferred from the first operating mode thereof into the second operating mode thereof by way of an actuator. Said actuator preferably comprises a rotatably mounted actuator shaft. More preferably, said actuator shaft and a rotational axis of the torque transmission device, which preferably coincides with the rotational axis of the first output shaft, or the projection of the actuator shaft and of the rotational axis in a shared plane, form an angle α between 80° and 100°, and particularly preferably the actuator shaft and the rotational axis, or the projections thereof in a shared plane, are disposed perpendicularly with respect to one another. The actuator preferably comprises an eccentric connected non-rotatably to the actuator shaft. More preferably, said eccentric is configured for contacting and transferring the driving part from the first into the second end position and/or vice versa. More preferably, the driving part can be acted upon by a spring force from a spring device in the direction toward one of the end positions. The displacement of the driving part between said end positions can be at least partially, or completely, achieved by a rotation of the actuator shaft, and thus of the eccentric.

In particular this angular arrangement of the actuator shaft in relation to the rotational axis of the torque transmission device makes a particularly space-saving design of the axle drive mechanism possible, and thus allows an improved axle drive mechanism to be achieved.

Preferably, the axle drive mechanism comprises at least one further shiftable torque transmission device (second torque transmission device). Said torque transmission device is preferably disposed between the driving toothed wheel and the second output shaft. The first and second torque transmission devices preferably have an identical design, and in this way a particularly easy activation thereof can be achieved.

Furthermore preferably, said torque transmission device also comprises a torque transmission region. The torque transmission region of the second torque transmission device is preferably at least partially disposed between said differential cage bearings in the axial direction. In particular the second shiftable torque transmission device makes it possible to reduce or prevent a rolling of the differential gear, in particular of the differential teeth, and thus allows a further increase in the efficiency of the axle drive mechanism to be achieved.

Preferably, at least one of the output shafts is rotatably mounted with respect to the differential cage by way of an output shaft mounting system. Said output shaft mounting system preferably comprises at least one rolling bearing. A particularly low degree of loss can be achieved in particular with a rolling bearing system. More preferably, said output shaft mounting system comprises at least one sliding bearing. A particularly simple mounting can be achieved in particular with a sliding bearing system. The output shaft mounting system preferably comprises at least one rolling bearing, preferably multiple rolling bearings, comprising preferably cylindrical rolling elements, particularly preferably what are known as needle bearings. In particular a mounting of the output shafts by way of what are known as rolling bearings makes it possible to lower the degree of loss of the axle drive mechanism, and thus allows an improved axle drive mechanism to be achieved.

Preferably, the driving part is rotatably mounted with respect to the output part by means of a clutch mounting system. Said clutch mounting system preferably comprises at least one rolling bearing. More preferably, the clutch mounting system comprises at least one sliding bearing. Particularly preferably, the clutch mounting system comprises multiple rolling bearings, preferably at least two rolling bearings. In particular a rolling mounting system of the driving part in relation to the output part makes it possible to achieve a further reduction of the degree of loss of the axle drive mechanism, and thus allows an improved axle drive mechanism to be achieved. More preferably, at least one needle bearing is provided for said mounting system, in particular needle-shaped rolling elements enable a particularly low installation space requirement.

A method for controlling an axle drive mechanism, which in particular is provided to transfer the torque transmission device from the first operating state thereof, in which no torque can be transmitted, into the second operating state thereof, in which torque can be transmitted, includes at least the following steps: ascertaining a rotational speed of the output part; ascertaining a rotational speed of the driving part; determining an equalizing speed from these rotational speeds; and driving the driving toothed wheel until the equalizing speed reaches or drops below a predefined threshold value.

If in particular the threshold value is reached or a drop below the same occurs, the torque transmission device is transferred from the first operating state thereof into the second operating state thereof.

The inventive axle drive mechanism can be used in a four-wheel drive vehicle in particular in such a way that no driving power is supplied to the axle drive mechanism from the vehicle engine in a first driving state. In the driving state, the drive train can be operated particularly efficiently. The reason for this is that, in said driving state, the torque transmission device in the axle drive mechanism is in the first operating state thereof, which is to say in the operating state in which no torque can be transmitted. In said first operating state of the torque transmission device, the axle drive mechanism is stopped in such a way that the driving toothed wheel is stopped, and in particular no power dissipation occurs on the driving toothed wheel and the mountings thereof. In one embodiment of the invention, in which only one torque transmission device is present, the differential gear rolls off in said first driving state as soon as the motor vehicle is moving. The reason for this is in particular that one of the output shafts can be decoupled from the driving wheel via the first operating state of the torque transmission device, and the second output shaft is driven by the rotational movement of the wheel.

If the driving situation requires the wheels of the motor vehicle which until then were not driven to be connected, this can be achieved by transferring the torque transmission device into the second operating state thereof. The inventive operating method provides for this purpose to accelerate the driving toothed wheel in such a way that the rotational speed of the stopped driving part of the torque transmission device and the rotational speed of the output part of the torque transmission device co-rotating with the wheel approximate one another. The driving toothed wheel is preferably accelerated until the difference between the rotational speeds of the driving and output parts reaches or drops below the predefined threshold value.

In particular this equalizing of the rotational speeds of the output part and the driving part of the torque transmission device makes it possible to particularly easily transfer the same from the first into the second operating state thereof, and thus allows an improved axle drive mechanism to be achieved.

Preferably, the threshold value $\Delta$ (difference, rotational speed of driving part, output part) is selected from a range to which $\Delta<500$ rpm (revolutions per minute) applies, especially <300 rpm, preferably <200 rpm, and particularly preferably <100 rpm, and furthermore $\Delta \geq 0$ rpm applies, especially >10 rpm, preferably >30 rpm, and particularly preferably $\geq 50$ rpm. Examinations have shown that a particularly easy and fast engagement or transfer of the torque transmission device from the first operating state thereof into the second operating state thereof is made possible for threshold values from the value range disclosed herein.

Preferably, the torque transmission device is transferred very quickly from the first into the second operating state thereof. More preferably, the time period in which the driving part of the torque transmission device is displaced from the first axial end position into the second axial end position is selected from a predetermined range. Said predetermined range t is <1 s, especially <500 milliseconds (ms), preferably <300 ms, and particularly preferably <200 ms.

The time period that is required to move the driving part of the torque transmission device from the first axial end position thereof into the second axial end position thereof shall in particular be understood to mean the time period that passes until said driving part is at least substantially load-free and is displaced from the first axial end position into the second axial end position, in particular without striking any obstacles. In particular, the first axial end position represents the position of the torque transmission device in which no torque can be transmitted by the same, and the second axial end position in particular represents the position of the torque transmission device in which torque can be transmitted.

The embodiments of the invention, as well as other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
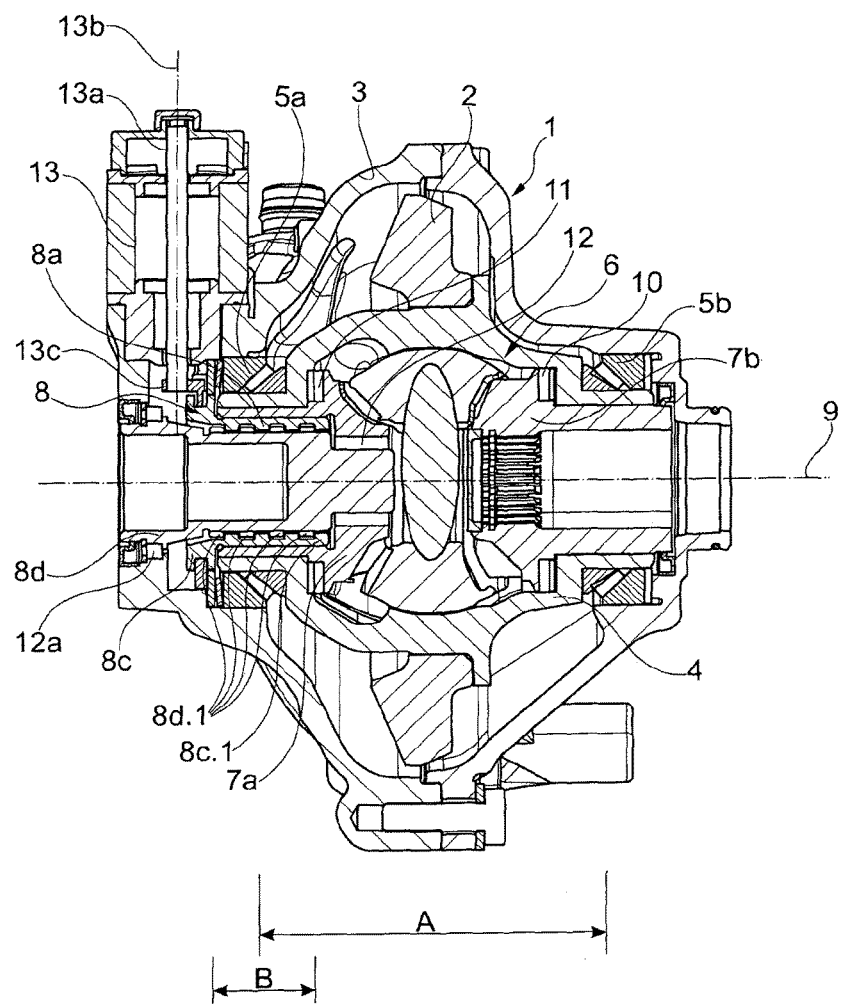
FIG. 1 is a full section view of the axle drive mechanism.

The axle drive mechanism 1 comprises a driving toothed wheel 2, which is accommodated in an axle drive mechanism housing 3 and mounted rotatably about the rotational axis 9. The driving toothed wheel 2 is non-rotatably connected to the differential cage 4. The differential gear 6 is accommodated in the differential cage 4, and said differential gear 6 can likewise be rotated about the rotational axis 9, together with the differential cage 4. The output of power to the driving wheels (not shown) takes place via the two output shafts 7a, 7b. The output shafts 7a, 7b are likewise mounted rotatably about the rotational axis 9. The output shafts 7a, 7b each comprise a needle bearing 10, 11 for axial mounting with respect to the differential cage 4.

The first output shaft 7a comprises a shiftable torque transmission device 8. The shiftable torque transmission device 8 comprises a torque transmission region 8a. The torque transmission region 8a is configured to transmit torque between the driving part 8c and the output part 8d. The driving part 8c is mounted be axially displaceable in the axial direction, which is to say in the direction of the rotational axis 9, for the transmission of torque from the driving part 8c to the output part 8d. For axial displacement, a force is applied to the driving part 8c by the actuator 13 in the direction of the rotational axis 9. The actuator 13 comprises an eccentric 13c for generating said force. This eccentric 13c is non-rotatably connected to the output shaft 13a of the actuator 13 and thus is mounted rotatably about the rotational axis 13b of the output shaft 13a. For transmitting the driving torque, the driving part 8c comprises multiple rows 8c.1 (4 rows) of teeth (form-locking elements) for torque transmission. The teeth 8c.1 are disposed at least substantially in a straight line in the circumferential direction (same axial position). The output part 8d furthermore comprises the same number of rows of teeth 8d.1 (4 rows) for torque transmission.

In the shift position shown in FIG. 1, the driving part 8c is in the first axial end position thereof, which is to say the different rows of teeth 8c.1 and 8d.1 are positioned in such a way with respect to one another that these rows of teeth slide past one another about the rotational axis 9 in the circumferential direction, and consequently no torque can be transmitted from the driving part 8c to the output part 8d.

In particular to improve the efficiency, the output part 8d is mounted rotatably with respect to the driving part 8c by a rolling mounting system 12. The output part 8d comprises an additional rolling mounting system 12a with respect to the axle drive mechanism housing 3.

The region A shows the axial distance between the rolling bearings 5a, 5b for the differential cage 4 in relation to the housing 3. The region B indicates the axial extension of the torque transmission region 8a of the torque transmission device 8. It is clearly apparent that the torque transmission region 8a (region B) at least partially overlaps the axial distance of the rolling bearings 5a, 5b (region A), and thus the torque transmission region 8a is at least partially disposed between the differential cage bearings 5a/b in the axial direction along the rotational axis 9.

Figure 2:
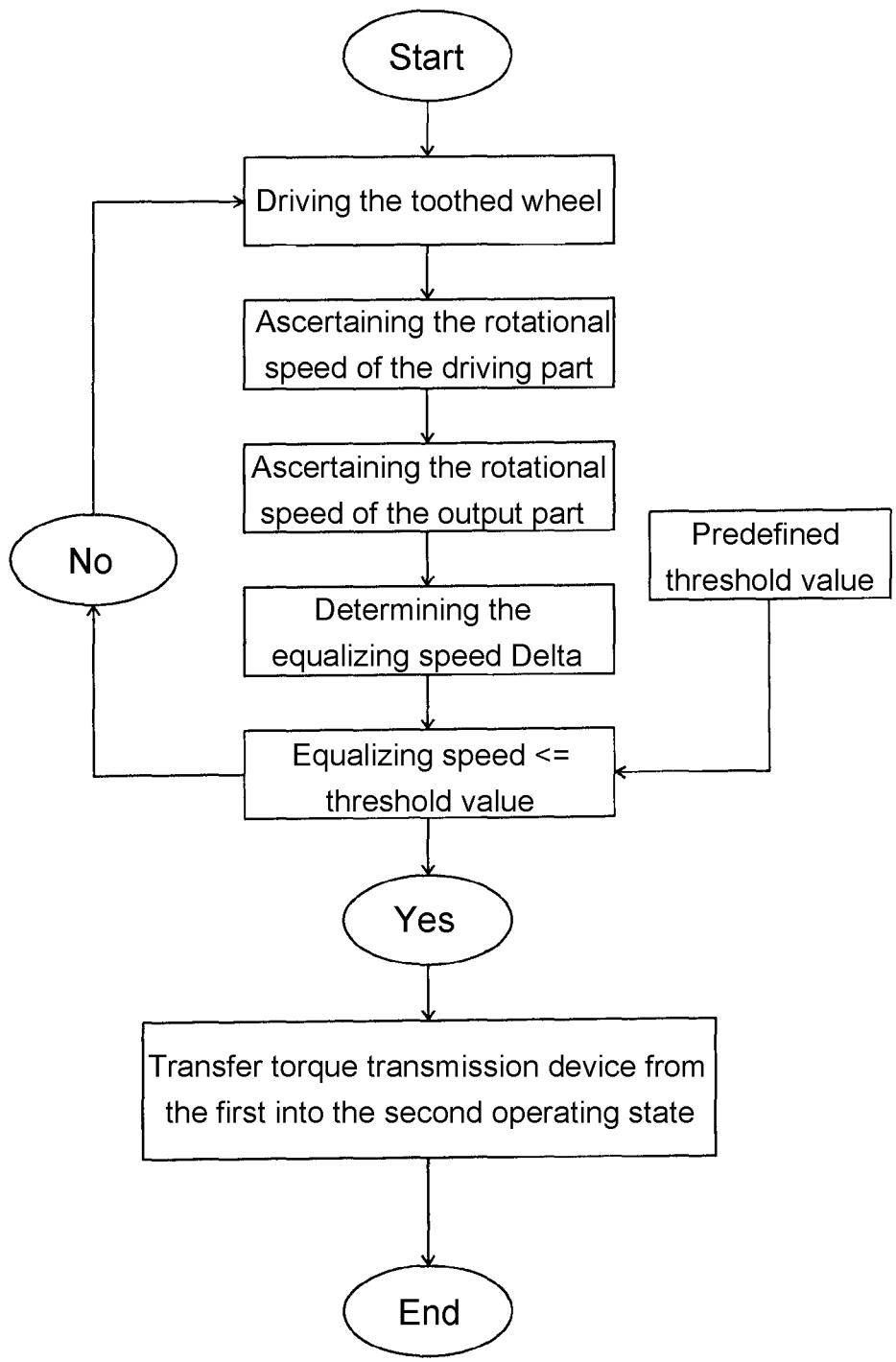
FIG. 2 is a flow chart for the inventive operating method disclosed herein.

FIG. 2 shows a flow chart for an operating method for an axle drive mechanism according to the invention. This operating method in particular relates to the engagement, which is to say to the transfer of the torque transmission device from the first operating state thereof into the second operating state thereof.

As is shown, no torque can be transmitted from the driving side to the output side of the torque transmission device in the first operating state, and torque can be transmitted in the second operating state.

Within the scope of the method, initially the rotational speed of the driving part of the torque transmission device is ascertained. Furthermore, the rotational speed of the output part is ascertained. Ascertaining the rotational speed in particular relates to the measurement of said rotational speed by way of a direct or indirect method. Indirect measuring of the rotational speed shall be understood to mean that the rotational speed of the component (driving/output part) is not directly determined, but rather the rotational speed of another component, which rotates at a particular speed ratio to the driving or output part.

An equalizing speed is then determined from the rotational speeds of the driving and output parts. In particular, the equalizing speed represents a rotational speed difference (magnitude) between the driving part and the output part. Said equalizing speed $\Delta$ is compared to a predefined threshold value. If the equalizing speed is smaller than said threshold value or corresponds to said threshold value, a control command is outputted to the torque transmission device, so that the same is transferred from the first into the second operating state thereof.

Examinations have shown that a rotational speed difference of <500 rpm is particularly advantageous for an operating the inventive method.

Further examinations have shown that a displacement of the driving part for transferring the torque transmission device into the second operating state thereof should take place within a time period that is less than one second. In particular at larger rotational speed differences $\Delta$ and shifting times longer than one second, shifting errors may occur, which is to say the torque transmission device cannot be transferred from the first into the second operating state thereof when the rotational speed difference $\Delta$ is too large and/or shifting is too slow, and such events in particular result in poorer comfort.

Figure 3:
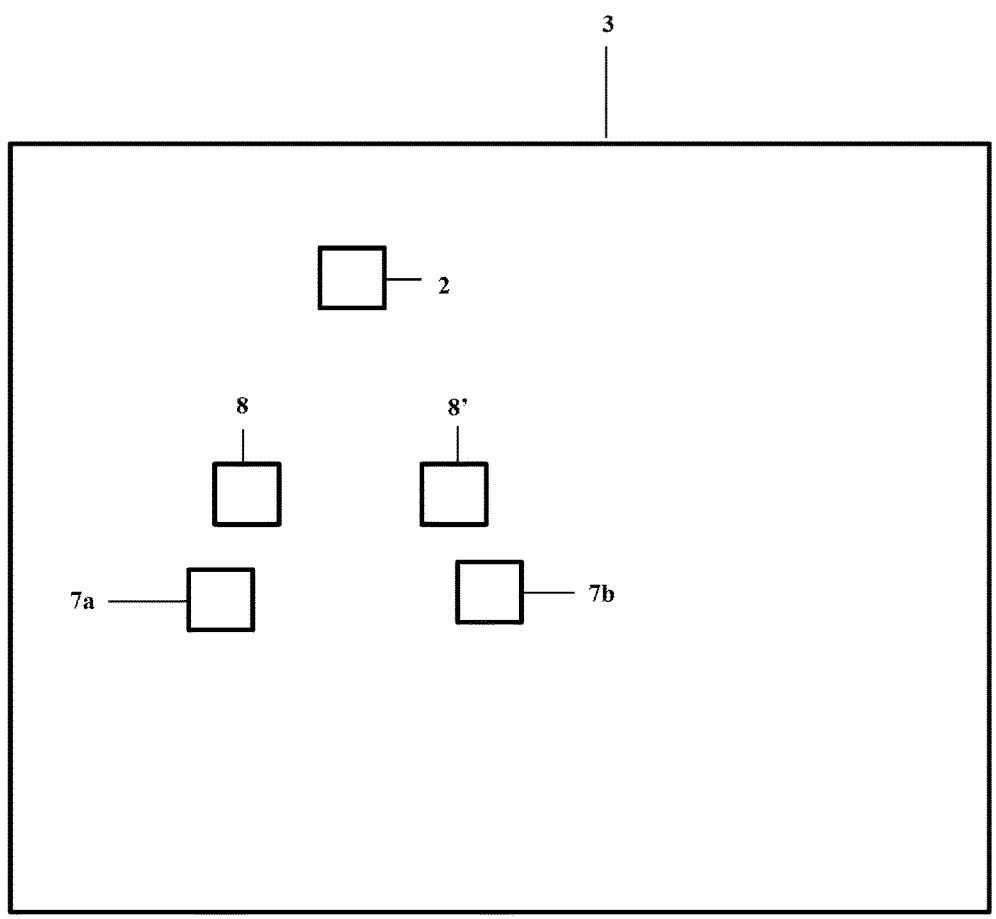
FIG. 3 is schematic diagram of the axle drive mechanism.

FIG. 3 shows one further shiftable torque transmission device 8', which is disposed between the driving toothed wheel 2 and the second output shaft 7b.

The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the invention should be construed to include everything within the scope of the appended claims and equivalents thereof.

What is claimed is:

1. An axle drive mechanism, comprising:
   a driving toothed wheel;
   a drive mechanism housing;
   a differential cage, which is mounted rotatably in the drive mechanism housing by way of a first and a second differential cage bearing, with said bearings being spaced apart from one another in an axial direction;
   a differential gear;
   a first and a second output shaft; and
   at least one shiftable torque transmission device, which is disposed radially inward relative to the driving toothed wheel and the first output shaft and comprises a torque transmission region, wherein the torque transmission region is at least partially disposed between said differential cage bearings in the axial direction, wherein
     the torque transmission device comprises a radially inner output part and a radially outer driving part, and the driving part can make contact with the output part in said torque transmission region, and the output part can be connected to the driving part in a form-locked manner, and
     the driving part is mounted displaceably in the axial direction.

2. The axle drive mechanism according to claim 1, wherein the torque transmission region is disposed inside at least one of the differential cage bearings.

3. The axle drive mechanism according to claim 2, wherein the driving part and the output part, for the form-locked connection to one another, each comprise one first and several further, rows of form-locking elements in the form of teeth that are distributed in a row across the circumference, and two consecutive rows are spaced apart from one another in the axial direction by a gap; and said gap is larger than the axial extension of at least one of the rows of form-locking elements.

4. The axle drive mechanism according to claim 3, wherein
   the torque transmission device is transferrable from the first into the second operating mode thereof by way of an actuator,
   the actuator comprises a rotatably mounted actuator shaft, and the actuator shaft and a rotational axis of the torque transmission device form an angle α of 80° to 100°.

5. The axle drive mechanism according to claim 4, further comprising
   one further shiftable torque transmission device, which is disposed between the driving toothed wheel and the second output shaft; and
   a torque transmission region, wherein
     the torque transmission region is at least partially disposed between said differential cage bearings in the axial direction.

6. The axle drive mechanism according to claim 5, wherein
   at least one of the output shafts is mounted rotatably with respect to the differential cage by way of an output shaft mounting system, and
   the output shaft mounting system comprises at least one rolling bearing.

7. The axle drive mechanism according to claim 6, wherein
   the output part is mounted rotatably with respect to the driving part by way of a clutch mounting system, and
   the clutch mounting system comprises at least one second rolling bearing.

8. A method for operating an axle drive mechanism, comprising the acts of:
   ascertaining a rotational speed of a radially inner output part, wherein the axle drive mechanism, includes a driving toothed wheel, a drive mechanism housing, a differential cage, which is mounted rotatably in the drive mechanism housing by way of a first and a second differential cage bearing, with said bearings being spaced apart from one another in an axial direction, a differential gear, a first and a second output shaft, and at least one shiftable torque transmission device, which is disposed radially inward relative to the driving toothed wheel and the first output shaft and comprises a torque transmission region, wherein the torque transmission region is at least partially disposed between said differential cage bearings in the axial direction, and wherein the torque transmission device comprises the radially inner output part and a radially outer driving part and the driving part can make contact with the output part in said torque transmission region, and the output part can be connected to the driving part in a form-locked manner, and the driving part is mounted displaceably in the axial direction;
   ascertaining a rotational speed of the radially outer driving part;
   determining an equalizing speed from said rotational speeds ($n_{8c}$, $n_{8d}$);
   driving the driving toothed wheel until the equalizing speed reaches or drops below a predefinable threshold value;
   transferring the torque transmission device into a second operating state.

9. The method for operating the axle drive mechanism according to claim 8, wherein the threshold value is selected from a range in which the threshold is smaller than 500 rpm and greater than or equal to 0 rpm.

10. The method for operating an axle drive mechanism according to claim 9, wherein a time for axially displacing the driving part from a first axial end position into a second axial end position is selected from a certain range, said range being smaller than 1 second.

* * * * *